United States Patent [19]

Wynne

[11] Patent Number: 4,529,970
[45] Date of Patent: Jul. 16, 1985

[54] SUPERVISION SYSTEM FOR MONITORING THE INTEGRITY OF A TRANSMISSION LINE

[75] Inventor: John M. Wynne, Oak Ridge, N.J.

[73] Assignee: Baker Industries Inc., Parsippany, N.J.

[21] Appl. No.: 434,804

[22] Filed: Oct. 18, 1982

[51] Int. Cl.³ ............................................. G08B 29/00
[52] U.S. Cl. ................................... 340/506; 340/507; 340/508; 340/509; 340/510; 340/511
[58] Field of Search ............... 340/506, 507, 508, 509, 340/510, 511

[56] References Cited

U.S. PATENT DOCUMENTS

| | | | |
|---|---|---|---|
| 2,684,475 | 7/1954 | Lode | 340/508 |
| 3,500,394 | 3/1970 | Egesdal | 340/511 |
| 3,540,042 | 11/1970 | Morrow et al. | 340/507 |
| 3,618,081 | 11/1971 | Morrow | 340/506 |
| 3,967,259 | 6/1976 | Lecuyer | 340/508 |
| 4,191,946 | 3/1980 | Knox et al. | 340/506 |
| 4,287,515 | 9/1981 | Raber et al. | 340/506 |

*Primary Examiner*—Donnie L. Crosland
*Attorney, Agent, or Firm*—James E. Tracy

[57] ABSTRACT

The integrity of a two-conductor transmission line, over which d-c energizing voltage is supplied to a series of shunt-connected detectors (such as fire and/or smoke detectors) and which line is terminated by an end-of-line capacitor, is monitored and repetitively tested by periodically and momentarily interrupting the application of the d-c energizing voltage to the transmission line or conductor pair, while at the same time connecting a resistive load across the line's input end to provide a discharge path for the capacitor. If the integrity is normal, meaning that the line is continuous and not open, and has no excessively high series resistance or excessively low shunt resistance, and also meaning that the capacitor is functioning normally and is not deteriorated, the capacitor will discharge very little during each test and will maintain a relatively high voltage across the resistive load. On the other hand, if there is any trouble on the line giving rise to abnormal integrity, a relatively low voltage will be developed across the resistive load during each test. By sensing the resistive load voltage, the integrity can therefore be determined. When the integrity is found to be abnormal, a trouble indicator provides an appropriate visual and/or audible signal signifying that a trouble condition exists on the conductor pair.

10 Claims, 1 Drawing Figure

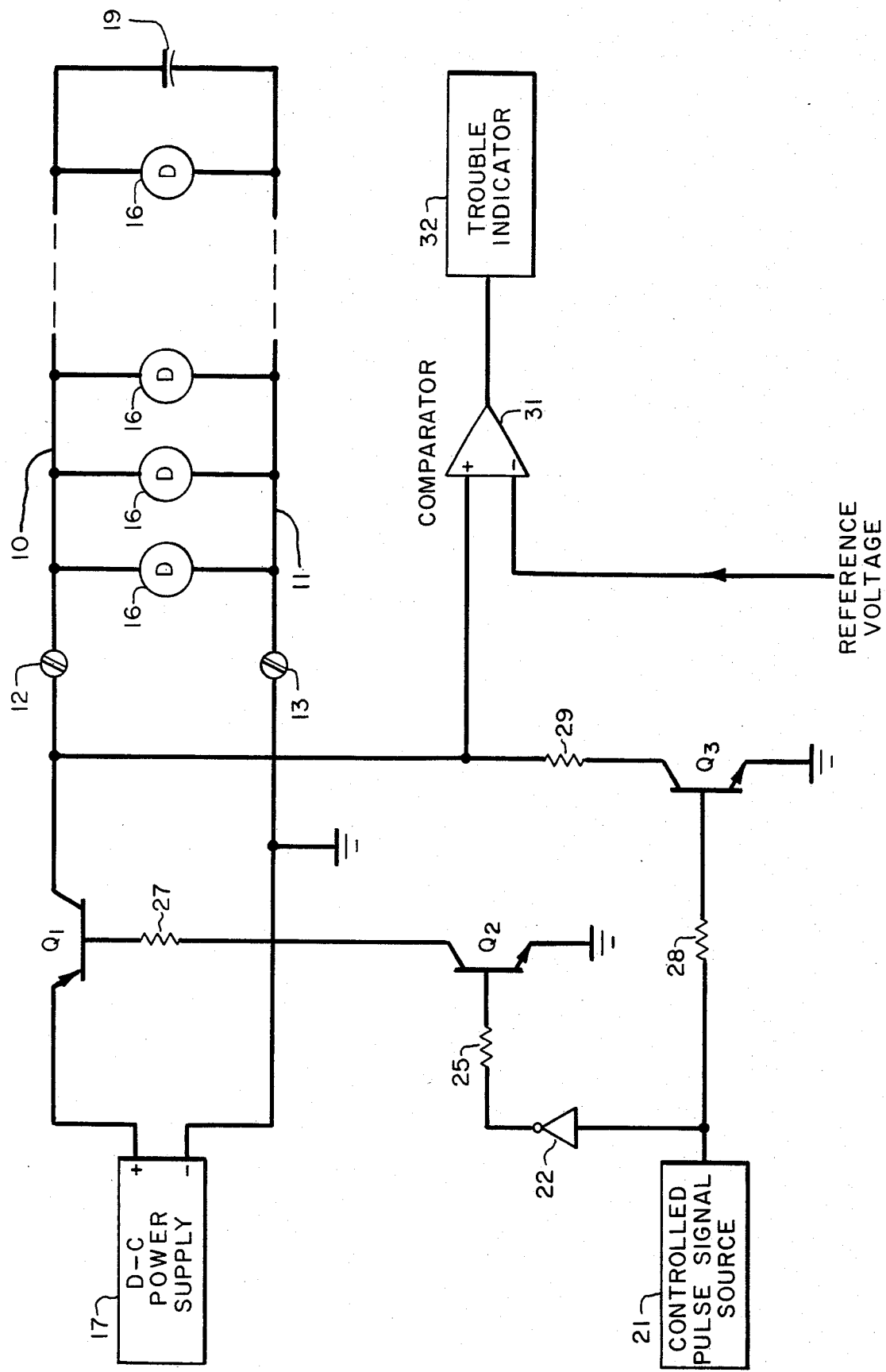

SUPERVISION SYSTEM FOR MONITORING THE INTEGRITY OF A TRANSMISSION LINE

BACKGROUND OF THE INVENTION

This invention relates to a system for supervising the integrity of a pair of transmission line conductors over which a D-C power supply is coupled to a series of d-c operated detectors, such as smoke and/or fire detectors, shunt-connected across the line. More specifically, the supervision system of the invention monitors the line's continuity, series resistance and shunt resistance, as well as the operation of an end-of-line capacitor connected across the conductor pair beyond the detectors.

Various detection systems have been developed to detect and indicate the presence of some undesired condition, such as particles of combustion, a fire, or the intrusion of a burglar. Many of these detection systems employ at least one pair of line conductors, namely a two-conductor transmission line, extending from a control panel or a central station into an area of a building to be protected. Individual d-c operated detectors, positioned at various locations in the area, are shunt-connected along the line in order to receive d-c energizing or operating voltage from a D-C power supply in the control panel, the d-c power ordinarily being produced by rectifying a-c line voltage. When an individual detector senses an undesired or alarm condition, an alarm signal is usually provided at the control panel.

It is important to supervise the line integrity, particularly for an open circuit condition which would render one or more of the detectors inoperative. This has been done in one previous system by connecting, across the end of the line, a resistance which draws more current, from the D-C power source, than the detectors under normal conditions. Integrity can be determined by monitoring the line current. Since such monitoring current flows continuously, due to the end-of-line resistor, considerable energy will be used even though an alarm condition does not arise. Moreover, it is common practice to provide a stand-by or backup battery for emergency use in case there is a power failure and a loss of the a-c line voltage. Such a battery must be of adequate size to supply the monitoring current for the duration of the emergency.

In a subsequently developed line integrity supervising system, the supervisory current required for supervision is materially reduced by replacing the end-of-line resistor with an end-of-line capacitor and by employing unfiltered, full-wave rectified a-c voltage for the d-c energizing voltage applied to the input of the two-conductor transmission line. Such an arrangement is disclosed in U.S. Pat. No. 4,191,946, issued Mar. 4, 1980, in the names of William A. Knox and Raymond J. Gonzalez. The capacitor provides sufficient filtering, when the line integrity is normal, so that the d-c voltage across the line will have a relatively small ripple component. However, if the line is open, or has an excessively high series resistance, or has an excessively low shunt resistance, or a deterioration of the end-of-line capacitor, the effect of the capacitor will be lost and a large ripple component will appear in the d-c voltage at the input end of the conductor pair. A supervisory circuit responds to the ripple component to determine when a trouble condition exists on the line, resulting in abnormal line integrity.

The approach, disclosed in the aforementioned Knox et al patent, cannot be employed, however, when the d-c energizing voltage, applied to the input of the line, has no significant ripple component and has a relatively constant instantaneous amplitude, as is the case when the d-c voltage is derived from full-wave rectified a-c line voltage which has been filtered or when the d-c voltage is derived from a stand-by battery used as an emergency power source during a power outage. This shortcoming of the Knox et al system has been overcome in the present invention by means of a unique supervision system of relatively simple and inexpensive construction. Not only can the d-c energizing voltage be ripple-free, unlike Knox et al, but considerably less supervisory current is needed in the present invention compared to that required by Knox et al.

SUMMARY OF THE INVENTION

The line supervision system of the invention monitors the integrity of a pair of transmission line conductors in a detection system of the type having a plurality of individual d-c operated detectors, positioned at various spaced-apart locations in an area to be protected, for detecting the presence of a predetermined undesired condition at each of those locations, each of the detectors being shunt-connected across the conductor pair in order to receive d-c energizing voltage which is applied to the input end of the conductor pair. The supervision system comprises an end-of-line capacitor connected across the conductor pair beyond the detectors. Means are included for momentarily interrupting the application of d-c energizing voltage to the conductor pair and at the same time placing a resistive load across the conductor pair's input end to provide a discharge path for the capacitor. Integrity testing means, which responds to the voltage developed across the resistive load during the momentary interruption of the d-c energizing voltage, effectively determines the integrity of the conductor pair. A trouble indication is provided when the integrity testing means finds that the line integrity is abnormal.

DESCRIPTION OF THE DRAWING

The features of the invention which are believed to be novel are set forth with particularity in the appended claims. The invention may best be understood, however, by reference to the following description in conjunction with the accompanying drawing which schematically illustrates a line supervision system, constructed in accordance with the invention, and the manner in which that supervision system may be incorporated in a fire detection system.

DESCRIPTION OF THE PREFERRED EMBODIMENT

Line conductors 10 and 11 constitute a conductor pair or transmission line which extends out into an area of a building to be protected. The input end of the conductor pair 10, 11 is coupled to a control panel by means of connecting screws 12 and 13. Positioned at various spaced-apart locations in the area are a plurality of individual d-c operated detectors 16, each of which is shunt-connected across the conductor pair 10, 11. When the detectors are energized, namely receive a d-c operating voltage, detection may be accomplished by one of the detectors sensing a fire or presence of particulate matter, going into alarm and providing a change in voltage or current on the conductor pair which is detected at the control panel.

The control panel includes a power supply section 17 which produces d-c energizing voltage for application to control circuitry (not shown) in the control panel and also for application to the input end of line 10, 11 in order to effect operation of detectors 16. As will be explained, PNP transistor $Q_1$ is normally on or conductive so that the positive output terminal of D-C power supply 17 will normally be connected, via connecting screw 12, to line conductor 10. Preferably, the d-c voltage will be developed in D-C power supply 17 by means of a full wave rectifier and filter arrangement to the input of which is applied a-c power line voltage. Due to the filtering action, the d-c voltage will have a relatively constant instantaneous amplitude and no appreciable ripple component. Of course, any appropriate d-c power source may be employed to produce the d-c energizing voltage for conductor pair 10, 11. For example, the required d-c voltage may be derived from a stand-by or backup battery, which would be the case in an emergency when there is a power failure resulting in a loss of a-c line voltage. As another example, the d-c voltage could be developed by a diesel engine-generator. It will be assumed, however, that regardless of the power source the d-c voltage will be substantially ripple-free. Of course, the magnitude of the d-c energizing voltage applied to conductor pair 10, 11 will be determined by the construction of the detectors 16. For example, the d-c voltage may have a magnitude of 24 volts. Note that the negative output terminal of D-C power supply 17, and consequently line conductor 11, are connected to a ground plane of reference potential, or zero volts.

Conductor pair 10, 11 is terminated, beyond the detectors 16, by an end-of-line capacitor 19 which is normally charged to the magnitude of the d-c energizing voltage applied to the input end of the conductor pair. Preferably, each detector presents a high impedance across the line 10, 11 under normal conditions. Upon sensing an incipient fire condition, however, a detector goes into an alarm state and, in effect, provides a low impedance across the line. As will be made apparent, end-of-line capacitor 19 is also included, and performs an important function, in the supervision system of the invention.

Transistor $Q_1$, which serves as a normally-closed solid state switch connected in series with line conductor 10, is maintained normally conductive or on by forward biasing its base-emitter junction. To explain, the output voltage of controlled pulse signal source 21 is normally at a relatively low level, specifically ground or zero potential. This zero level is converted by inverter 22 to a relatively high positive voltage level for application through resistor 25 to the base of NPN transistor $Q_2$. This forward biases the base-emitter junction of the transistor and turns it on. The base of transistor $Q_1$ will therefore be connected to ground through resistor 27 and the emitter-collector conduction path of transistor $Q_2$, causing the base-emitter junction of transistor $Q_1$ to be forward biased to maintain the transistor in its conductive or on condition so that the positive output terminal of D-C power supply 17 will normally be connected to screw terminal 12 and line conductor 10 via the emitter-collector conduction path of transistor $Q_1$. During this normal mode of operation when the output of controlled pulse signal pource 21 is at zero or ground potential, NPN transistor $Q_3$ will be turned off and will be non-conductive since both its base and emitter will be at ground potential. Resistor 29 will thus be ineffective at this time. The d-c energizing voltage on screw 12 and line conductor 10 will be applied to the (+) input of voltage comparator 31, whose (−) input receives a positive reference voltage which has a lower magnitude than the d-c energizing voltage. As a consequence, comparator 31 will be established in its relatively high level output condition. Trouble indicator 32 is constructed to respond to the output of comparator 31 in one manner when the comparator's output voltage is relatively high and in a different manner when the output voltage is relatively low. The operation of comparator 31 and trouble indicator 32 will be described later.

In order to monitor and test the integrity of conductor pair 10, 11, namely to sense for trouble on the line, transistor $Q_1$ is switched off momentarily to interrupt the application of d-c energizing voltage to the conductor pair 10, 11, while at the same time transistor $Q_3$ is switched on to place, across the input end of the conductor pair, resistor 29 which constitutes a resistive load and produces a voltage signal which reflects the integrity of the conductor pair. To explain, to conduct an integrity test controlled pulse signal source 21 applies a positive-going pulse directly to the input of inverter 22 and through resistor 28 to the base of transistor $Q_3$. Pulse signal source 21 may include an oscillator or cycling apparatus so that periodically recurring pulses are produced to effect repetitive testing of the line integrity. Each pulse may have a width of, for example, 20 milliseconds and only one pulse is produced every three seconds. In this way, the time duration of each momentary interruption of the d-c energizing voltage applied to line 10, 11 is extremely small compared to the time interval or separation between successive tests. Those skilled in the art will realize that the value of resistor 29 and the pulse width applied to transistor $Q_3$ are related in order to overcome the line capacitance between conductors 10 and 11. By varying the resistance of resistor 29 and/or the width of the pulses, any value of line capacitance can be accommodated.

A positive-going pulse at the input of inverter 22 results in a negative-going pulse (dropping down to zero volts) at the base of transistor $Q_2$. The transistor, no longer being forward biased, turns off and removes the forward bias from transistor $Q_1$ which thereupon turns off. The d-c voltage applied to conductor pair 10, 11 is thus temporarily interrupted or withheld during the 20 millisecond interval of the pulse from source 21. At the same time that transistor $Q_1$ is being switched off, the positive-going pulse from source 21 forward biases the base-emitter junction of transistor $Q_3$ and turns that transistor on, thereby inserting resistive load 29 across the input end of conductor pair 10, 11. Hence, transistor $Q_3$ functions as a normally-open solid state switch which, when closed, connects resistive load 29 across the transmission line's input end.

If the integrity of line 10, 11 is normal, the line will be continuous and not open, its series resistance will be normal and relatively low, and its shunt resistance will be normal and relatively high. Furthermore, normal integrity also means that end-of-line capacitor 19 is functioning normally and is not deteriorated. As mentioned, capacitor 19 is normally charged to the magnitude of the d-c energizing voltage applied to the input end of conductor pair 10, 11. If the line integrity is normal when an integrity test is made, the voltage across capacitor 19 will be effectively applied to resistive load 29. Capacitor 19 will be appropriately sized to provide sufficient filtering action so that during the relatively short test interval (20 milliseconds) the voltage across the resistive load will be maintained relatively high by capacitor 19, and almost equal to the magnitude of the d-c energizing voltage. In effect, resistive load 29 provides a discharge path for capacitor 19 when the d-c energizing voltage is momentarily interrupted by transistor $Q_1$ and an integrity check or test is conducted. With normal integrity, capacitor 19 will discharge very little during a test, as a result of which the voltage across resistive load 29 remains high during the entire test interval.

On the other hand, if any of the above-mentioned trouble conditions exist on the line, giving rise to abnormal integrity, a relatively low voltage will be produced across resistive load 29 when a test is made. Any one of those troubles prevents capacitor 19 from maintaining a relatively high voltage on resistive load 29 during a test interval.

Hence, the voltage across resistor 29, during a test, represents or reflects the integrity of the conductor pair 10, 11, being high when the integrity is normal and low when abnormal. Voltage comparator 31 essentially constitutes integrity testing means which senses, or responds to, the voltage developed across resistive load 29 to determine the integrity of the line conductors 10, 11. In effect, comparator 31, transistor $Q_3$ and resistor 29 function as a sensing means for sensing the voltage across the input end of the conductor pair 10, 11 during each momentary interruption of the d-c energizing voltage when an integrity check is made.

To elucidate, the positive voltage produced at the upper terminal of resistive load 29 is applied to the (+) input of comparator 31, while a positive reference voltage, effectively representing a normal line integrity, is applied to the comparator's (−) input. When the integrity is normal, the relatively high voltage across resistive load 29 establishes the (+) input of comparator 31 at a voltage which is greater than (namely, positive relative to) the reference voltage at the (−) input. Under those input conditions, the output voltage of comparator 31 will be relatively high. As mentioned previously, comparator 31 also provides a high level output during the normal operating mode when transistor $Q_1$ is conductive. Trouble indicator 32, which responds to and is controlled by voltage comparator 31, will thus provide the same indication (visual and/or audible) during the normal mode and during a test interval when it is found that the line integrity is normal.

When an integrity test shows abnormal integrity, the relatively low voltage across resistive load 29 establishes the (+) input of comparator 31 at a voltage which is less than (namely, negative with respect to) that at the comparator's (−) input. As a consequence, the comparator will switch to its low output voltage condition. Trouble indicator 32 responds to this low output voltage to produce an appropriate visual and/or audible signal to indicate that a trouble condition exists on the line and that the integrity is abnormal. Preferably, a latch circuit would be included in trouble indicator 32 to maintain the trouble signal on after the test is completed and d-c energizing voltage is once again applied to conductor pair 10, 11. Operating personnel may be dispatched from the control panel or central station, where the trouble signal is displayed and/or sounded, to the detectors along the conductor pair to locate and correct the problem.

While a particular embodiment of the invention has been shown and described, modifications made be made, and it is intended in the appended claims to cover all such modifications as may fall within the true spirit and scope of the invention.

I claim:

1. A line supervision system for monitoring the integrity of a pair of transmission line conductors in a detection system of the type having a plurality of individual d-c operated detectors, positioned at various spaced-apart locations in an area to be protected, for detecting the presence of a predetermined undesired condition at each of those locations, each of the detectors being shunt-connected across the conductor pair in order to receive d-c energizing voltage which is applied to the input end of the conductor pair, said line supervision system comprising:

an end-of-line capacitor connected across the conductor pair beyond the detectors;

means for momentarily interrupting the application of d-c energizing voltage to the conductor pair and at the same time placing a resistive load across the conductor pair's input end to provide a discharge path for said capacitor;

integrity testing means, responsive to the voltage developed across said resistive load during the momentary interruption of the d-c energizing voltage, for effectively determining the integrity of the conductor pair;

and indicator means for providing a trouble indication when said integrity testing means senses a trouble condition on the conductor pair and finds that the line integrity is abnormal.

2. A line supervision system according to claim 1 wherein said integrity testing means includes a voltage comparator which effectively compares the voltage across said resistive load with a reference voltage to detect a trouble condition on the conductor pair.

3. A line supervision system according to claim 1 wherein the voltage developed across said resistive load is relatively high when the integrity of the conductor pair is normal but is relatively low when the integrity is abnormal, and wherein said integrity testing means includes a voltage comparator for comparing the voltage across the resistive load with a reference voltage, effectively representing a normal line integrity, to determine when the resistive load voltage is relatively low, thereby signifying that the integrity is abnormal and that a trouble condition exists on the conductor pair.

4. A line supervision system according to claim 1 wherein the application of d-c energizing voltage to the conductor pair is periodically momentarily interrupted to effect repetitive testing of the line integrity, the time duration of each momentary interruption being extremely small compared to the time interval between successive tests.

5. A line supervision system according to claim 1 wherein the d-c energizing voltage is momentarily interrupted by opening a normally-closed switch connected in series with one of the line conductors, and wherein said resistive load is connected across the input end of the conductor pair by closing a normally-open switch connected in series with said resistive load.

6. A line supervision system according to claim 1 wherein said capacitor is normally charged to substantially the magnitude of the d-c energizing voltage; wherein said capacitor discharges very little through said resistive load, during the momentary interruption of the d-c energizing voltage, if the line integrity is normal, the conductor pair thereby being continuous and not open, its series line resistance being normal and relatively low and its shunt resistance being normal and relatively high, and said capacitor thereby functioning normally and not being deteriorated, the voltage across said resistive load consequently being maintained relatively high by said capacitor and almost equal to the magnitude of the d-c energizing voltage when the line integrity is normal, whereas when the integrity is abnormal the voltage across said resistive load is relatively low; wherein said integrity testing means effectively determines whether the voltage developed across said resistive load is relatively high or relatively low, thereby detecting whether the integrity of the conductor pair is normal or abnormal; and wherein said indicator means responds to the output of said integrity testing means and provides a trouble indication when the line integrity is found to be abnormal.

7. A line supervision system according to claim 6 wherein said integrity testing means includes a voltage comparator which compares the voltage across said resistive load with a reference voltage, effectively representing a normal line integrity but being less than the resistive load voltage when the line integrity is normal, while being greater than the resistive load voltage when the integrity is abnormal, to determine whether the resistive load voltage is relatively high or relatively low.

8. A line supervision system according to claim 1 wherein the d-c energizing voltage is steady, having a constant instantaneous amplitude and being ripple-free.

9. A line supervision system for monitoring the integrity of a pair of transmission line conductors in a detection system of the type having a plurality of individual d-c operated detectors, positioned at various spaced-apart locations in an area to be protected, for detecting the presence of a predetermined undesired condition at each of those locations, each of the detectors being shunt-connected across the conductor pair in order to receive d-c energizing voltage which is applied to the input end of the conductor pair, said line supervision system comprising:

an end-of-line capacitor connected across the conductor pair beyond the detectors;

means for momentarily interrupting the application of d-c energizing voltage to the conductor pair;

sensing means for effectively sensing the voltage across the input end of the conductor pair, during the momentary interruption of the d-c energizing voltage, to determine the integrity of the conductor pair;

and indicator means, controlled by said sensing means, for providing a trouble indication when a trouble condition is detected on the conductor pair.

10. A line supervision system for monitoring the line integrity of a pair of transmission line conductors in a detection system wherein a plurality of individual d-c operated detectors, disposed along and each shunt-connected across the conductor pair, detect the presence of a predetermined undesired condition at spaced-apart locations in an area to be protected, a D-C power supply being connected to the input end of the conductor pair to apply a d-c energizing voltage of desired magnitude to each of the detectors to effect operation thereof, said line supervision system comprising:

an end-of-line capacitor, connected across the conductor pair beyond the detectors, normally charged to substantially the magnitude of the d-c energizing voltage;

means for momentarily interrupting the application of d-c energizing voltage to the conductor pair and for simultaneously inserting a resistive load across the conductor pair's input end, said resistive load constituting a discharge path for said capacitor and producing a voltage signal which reflects the integrity of the conductor pair;

means for effectively sensing the signal developed by said resistive load to detect a trouble condition on the conductor pair;

and means for providing a trouble indication when a trouble condition is discovered.

* * * * *